United States Patent [19]

MacDonald

[11] Patent Number: 4,466,694

[45] Date of Patent: Aug. 21, 1984

[54] WAVELENGTH SELECTIVE OPTICAL COUPLER

[75] Inventor: Robert I. MacDonald, Ottawa, Canada

[73] Assignee: Her Majesty the Queen in right of Canada, as represented by the Minister of National Defence of Her Majesty's Canadian Government, Ottawa, Canada

[21] Appl. No.: 47,174

[22] Filed: Jun. 8, 1979

[30] Foreign Application Priority Data

Jun. 15, 1978 [CA] Canada ................................. 305522

[51] Int. Cl.³ .............................................. G02B 5/14
[52] U.S. Cl. .................................................. 350/96.19
[58] Field of Search .................. 350/96.15, 96.19, 352

[56] References Cited

U.S. PATENT DOCUMENTS

| | | | |
|---|---|---|---|
| 3,884,549 | 5/1975 | Wang et al. | 350/96.19 |
| 3,891,302 | 6/1975 | Dabby et al. | 350/96.19 |
| 3,905,676 | 9/1975 | Ulrich | 350/96.19 |
| 3,982,810 | 9/1976 | Tamir et al. | 350/96.19 |

Primary Examiner—Stewart J. Levy
Attorney, Agent, or Firm—Anthony T. Lane; Jeremiah G. Murray; Edward Goldberg

[57] ABSTRACT

An optical coupler for a fiber optic communication system, which couples one band of wavelengths out of the fiber while allowing others to be carried further. This allows wavelength division multiplexing of different signals within a single fiber. The preferred embodiment of the invention is comprised of a waveguide having aperiodic corrugations in one wall and a Fabry-Perot type resonator enclosing the waveguide around the corrugations with its axis transverse thereto.

7 Claims, 6 Drawing Figures

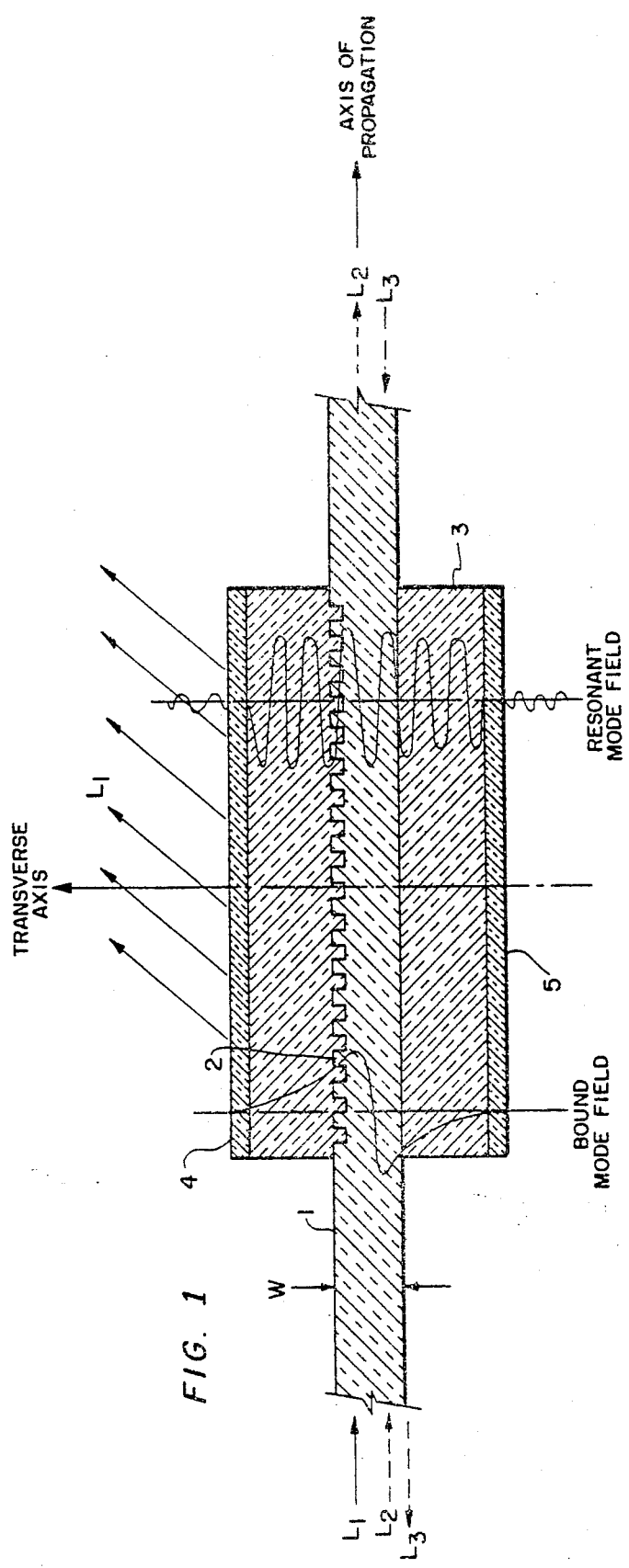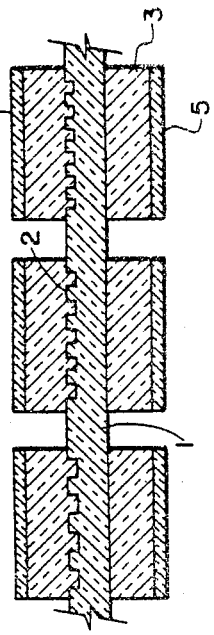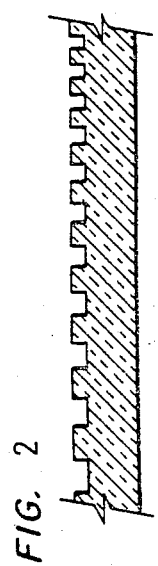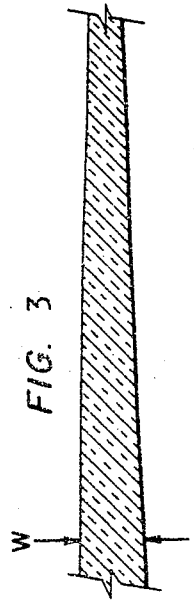

WAVELENGTH SELECTIVE OPTICAL COUPLER

BACKGROUND OF THE INVENTION

1. Field of the Invention

This invention relates to a frequency selective optical coupler which is particularly useful in fiber optic waveguide multiplex communication systems.

2. Description of the Prior Art

Fiber optic communication systems have been developed to the point where they appear to be able to provide reliable long distance communication channels. While use of such systems considerably reduces the cable size and weight for a given bandwidth, generally only a single light beam is transmitted via each specific fiber, since there has been no satisfactory structure for segregating the various wavelengths of light which might carry different signals on a single fiber. One known device, described in U.S. Pat. No. 3,905,676 issued Sept. 16, 1975, employs uniform periodic diffraction gratings to provide selective coupling of a particular wavelength band of light exiting a fiber.

SUMMARY OF THE INVENTION

The present invention is directed to an optical coupler which provides greater control of wavelength selectivity and permits a single light-waveguide to be used as the carrier medium for a plurality of different signals in a wavelength-division multiplex transmission system. In such a transmission system, signals of different frequencies can pass in opposite directions in the same optical waveguide. Clearly the utility of optical waveguides is substantially expanded, allowing a greater number of signals to be transmitted, and allowing conversion of the waveguide into a bidirectional transmission path.

The invention, in general, is a wavelength selective optical coupler comprising a waveguide having corrugations in one wall including a varying dimension, and a Fabry-Perot type resonator enclosing the waveguide around the corrugations with its axis transverse thereto.

The corrugations in the waveguide, which are preferably blazed and aperiodic, serve to couple light out of the waveguide into the resonator at a wavelength-dependent angle. The resonator cannot be excited, however, if the coupling angle and the wavelength do not correspond to a resonance of the structure. In that case, optical radiation entering the resonator on a bound mode of the waveguide is not coupled into the resonator and passes further along the waveguide.

On the other hand, if the wavelength and coupling angle are appropriate to excite a resonator excitation mode, the radiation is coupled into the resonator.

The resonator is made very leaky in comparison to the waveguide so that power coupled into the resonator leaks out very much faster than the power at that wavelength carried in the portions of the waveguide external to the resonator. The power leaking out of the resonator is available for optical detection or other purposes.

It has been found that the wavelength band over which the resonator is excited can be very much narrower than the wavelength bands that do not excite it. The power at a very narrow band of wavelengths can thus be stripped out of the waveguide by the present structure.

A better understanding of the invention will be obtained by reference to the more detailed description below, and to the following drawings.

BRIEF DESCRIPTION OF THE DRAWINGS

FIG. 1 is a cross-sectional view of a corrugated waveguide and resonator;

FIG. 2 is a cross section of a portion of a waveguide having an aperiodic corrugation;

FIG. 3 shows a partial cross section of a waveguide having a variable width;

FIG. 4 is a cross section showing a plurality of resonators and corrugation sections;

DESCRIPTION OF THE PREFERRED EMBODIMENTS

Figure 5:
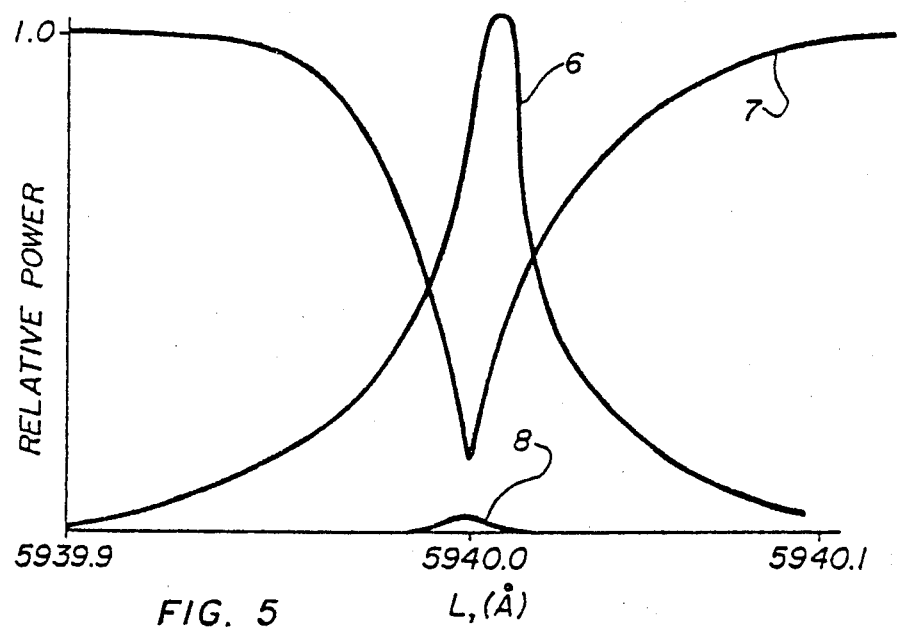
FIG. 5 is a graph of the relative power output of the inventive coupler, plotted against wavelength.

FIG. 1 shows a planar optical waveguide 1 which may form part of or be coupled to an optical fiber. Corrugations 2 are formed in a wall of the waveguide. Enclosing the waveguide around the corrugations is a cavity resonator 3 of the Fabry-Perot type, in which the axis of the resonator is transverse to that of the waveguide.

The resonator is comprised of reflectors 4 and 5, one of which, shown as reflector 4, on the side adjacent the corrugations, is made leaky to optical radiation such that power which is coupled into the resonator leaks out faster than the power remaining in the waveguide.

Various forms of corrugations may be useful in various alternative designs. Accordingly, the corrugations should be considered in their more generic sense as diffraction gratings, particularly blazed gratings which are gratings with specially shaped teeth. A description of such gratings may be found in the publication THE BELL SYSTEM TECHNICAL JOURNAL, Volume 56, March 77, No. 3, pages 329–353. Blazed corrugations can be used to couple unequal amounts of power out on the two sides of the waveguide. For example, the loss at nonresonant wavelengths can be reduced by coupling more of the power out of the waveguide on the side having the highest reflectivity Fabry-Perot reflector.

In operation, it may be seen that optical power at two example frequencies $L_1$ and $L_2$ enter the corrugation portion of the waveguide. The corrugations, being predetermined to match the wavelength and provide an output coupling angle for one of the signals, for instance at wavelength $L_1$, being appropriate to excite a resonator mode at the wavelength $L_1$. The radiation at that wavelength is coupled into the resonator. The signal at a single wavelength $L_1$ is further coupled out through the leaky reflector wall 4, which signal can be detected or transmitted further.

Accordingly, it will be seen that a single wavelength (or band of) signal is coupled out of the optical waveguide. Yet the signal $L_2$ is unaffected and continues to pass further along the waveguide.

As shown in FIG. 2, the corrugations in the waveguide are made aperiodic, with a gradually diminishing period for example, such that a band of signals of controlled optical bandwidth could be coupled out. For the same purpose, the width of the waveguide can be varied along the length of the coupler, as shown in FIG. 3.

These couplers can also act as wavelength-selective filters of controllable properties. FIG. 4 shows another variation using a tandem arrangement of corrugations of different periods for coupling a plurality of wavelengths sequentially out of the waveguide.

FIG. 5 is a graph of relative power plotted against wavelength for the coupler of FIG. 1. Curve 6 depicts the power coupled out of the coupler, while curve 7 depicts the power which is transmitted further down the waveguide. Curve 8 depicts the reflected power within the resonator. The wavelength of the power output is clearly of extremely narrow band, centered at 5940.0 angstroms.

Figure 6:
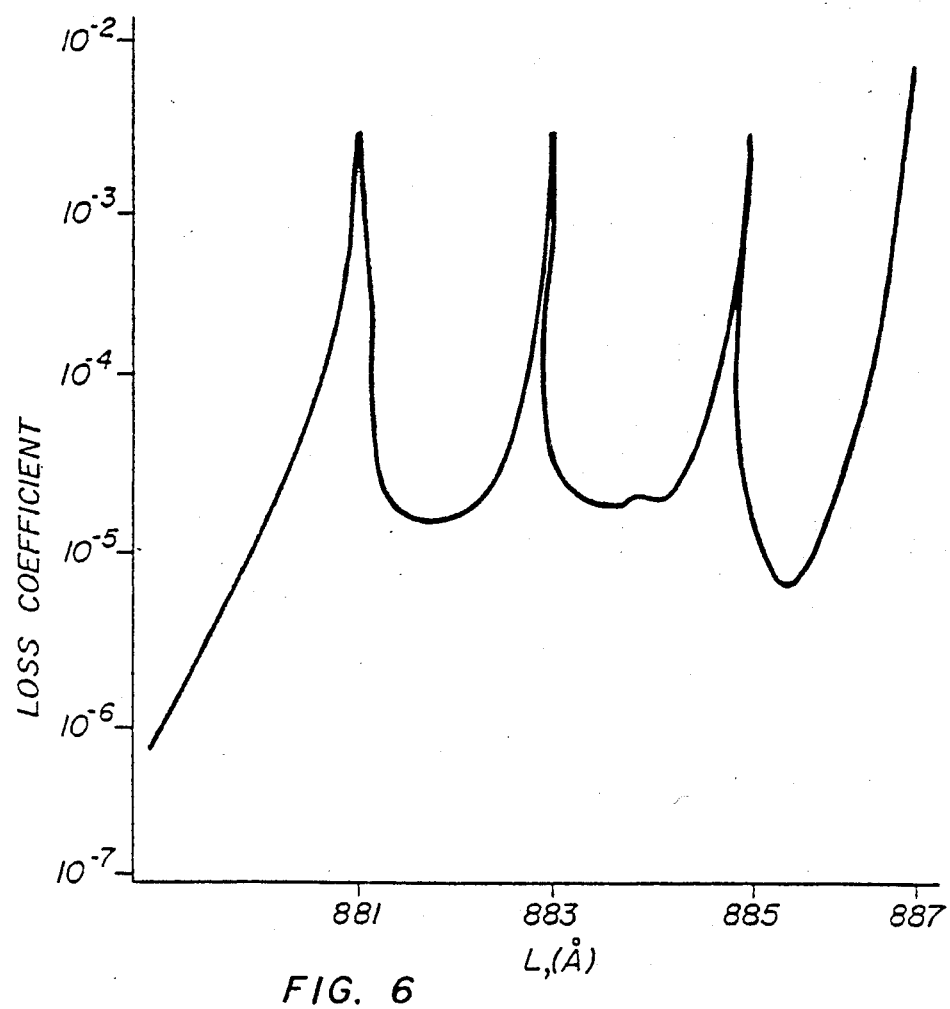
FIG. 6 is a graph of the loss coefficient plotted against wavelength of a signal passing through a coupler.

To illustrate the degree of signal coupling which may be obtained, consider FIG. 6 in which the loss co-efficient of a very wide corrugated dielectric planar optical waveguide near mode cutoff which operation mode is not preferred, but will suffice for example purposes. This relationship was determined to exist where the waveguide width which was 100 microns, the corrugation depth was 0.2 microns, the corrugation period was 440 nanometers. This structure had no external resonator, but employed the Fresnel reflections at the waveguide walls themselves as the Fabry-Perot mirrors. The peaks in output response occur at approximately wavelengths of 881, 883, 885 and 887 nanometers. The relationship of FIG. 6 is based on the output radiation propagating nearly at the critical angle in the waveguide, resulting in a relatively high Q. The loss co-efficient at the maximum of the first peak has about 140 times its value at the minimum after the first peak. If the waveguide were of a length equal to the inverse of the peak loss co-efficient, the power coupled out at the first resonance would be 19.5 dB greater than the power coupled at the first minimum.

A thick, high-refractive-index structure operated near cutoff is not suitable for a practical output coupler. The loss co-efficients are believed to be too small, the output signal travels at an inconvenient angle, and the power comes out both sides of the waveguide in wavelength-dependent proportions.

Considering the TE modes only, one of the groups of bound modes in the structure of FIG. 1 consists of modes whose field amplitudes are non-cyclic in the Z direction in the dielectric of the resonator. The modes of this group (called "bound" modes) are similar to the modes of dielectric slab of the waveguide in the absence of the resonator. If the effective width of the waveguide for modes of this group is less than the separation of the resonator reflectors, from the waveguide walls, the propagation constants of the group match closely the bound-mode propagation constants of the free slab. Reflection of power in bound modes propagating into the coupler is thus small. The modes of the second group (called "resonator" modes) have cyclic field distribution in the Z direction in the regions of the resonator dielectric. These modes are analogous to the radiation modes of the free slab waveguide, but because of the reflectors, they are bound in the resonator.

When the reflectors are perfect, this group consists of a finite discrete set of modes. If the reflectors are imperfect, however, the discrete modes of this set broaden into sections of a continuum of leaky modes.

In one example of the invention, the width of the waveguide was 5 microns and the width of the resonator from reflector to reflector was 20 microns. The wavelength for resonance was 880 nanometers, and coupling occurred in the lowest-order bound mode and the highest-order resonant mode. The linewidth of the wavelength-selective coupler was about 0.3 nanometers, while rejection of power at a wavelength further than 1 nanometer from the resonant wavelength was greater than 20 dB. This rejection corresponds to 40 dB of signal power rejection after detection because of the power-voltage conversion that occurs within an optical detector. At resonance 90% of the optical power leaves the coupler, whereas off resonance more than 99% is transmitted.

The free spectral range is greater than 20 nanometers so that this coupler would in principle provide the possibility of demultiplexing 20 channels with less than 40 dB crosstalk.

It should be noted, however, that the linewidth, crosstalk, rejection and other properties of such a device can be varied considerably by altering the device parameters. The aforenoted example provides but a general idea of the properties of the wavelength selective resonant couplers of the inventive type.

The present invention could be used in pulse code modulation systems using various wavelengths for various channels. While for analog television systems, the crosstalk may well be excessive, isolation can be obtained by employing radio frequency carrier signals at different wavelengths on each of the channels.

The present coupler can also be used in duplex transmission systems. The upstream channel and the downstream channel can be sent at different wavelengths. The coupler can be used to remove the received power from fiber optical waveguide, while allowing the transmitted power to pass through it, with little loss in both directions. The present coupler can also be used as an input coupler for wavelength multiplexing.

Clearly the inventive device offers a novel component which allows considerable expansion of the utility of optical communication systems.

A person skilled in the art understanding this invention may now conceive of various alternatives or embodiments using the principles described. All are considered within the sphere and scope of the invention as defined in the appended claims.

What is claimed is:

1. A wavelength-selective optical signal coupler comprising:
    a. An elongated optical waveguide having a section containing a plurality of blazed corrugations, said corrugations including alternating projections and spaces along a wall parallel to the longitudinal axis of said waveguide, said waveguide including a width dimension normal to said longitudinal axis and measured between the maximum outermost surfaces of said waveguide and a longitudinal spacing dimension between adjacent projections, at least one of said dimensions varying progressively along the length of the waveguide in the section having the blazed corrugations so as to control the bandpass of the coupler; and
    b. a Fabry-Perot type resonator having longitudinal reflective walls spaced about said waveguide section, one of said reflective walls being leaky and passing a bandwidth signal resonant with said resonator.

2. The coupler as defined in claim 1, wherein said varying dimension is a gradually changing waveguide width.

3. The coupler as defined in claim 1, in which the width of the waveguide is at least many times the wavelength of the signal carried thereby.

4. The coupler of claim 1 including means supplying a plurality of individual optical signals having different wavelengths,
a plurality of sets of different corrugations of different periods in the wall of said waveguide, each set controlling an optical bandwidth of a respective individual signal passing out of said coupler,
a plurality of Fabry-Perot type resonators having reflective walls spaced about the waveguide opposite respective sets of corrugations, each resonator having a leaky wall passing a respective narrow bandwidth signal and the other signals being carried along said waveguide.

5. The optical coupler as defined in claim 1, wherein said waveguide is adapted to pass signals of different wavelengths in opposite directions.

6. The coupler as defined in claim 1 wherein said varying dimension is the spacing dimension between adjacent projections to provide aperiodic corrugations having a gradually changing period along the length.

7. The coupler as defined in claim 6, in which the corrugation wavelength is predetermined to produce coupling between a mode of the coupler of which its transverse field distribution is cyclic only in the waveguide, and another mode of which its transverse field distribution is cyclic in both the waveguide and resonator.

* * * * *